Patented Jan. 27, 1953

2,626,933

UNITED STATES PATENT OFFICE 2,626,933

HYDRAZIDE OF ORGANIC SULFONIC ACID AS BLOWING AGENT IN PLASTICS

Friedrich Lober and Max Bögemann, Leverkusen-Bayerwerk, and Richard Wegler, Leverkusen-Schlebusch, Germany, assignors to Farbenfabriken Bayer, Leverkusen, Germany No Drawing. Application July 15, 1949, Serial No. 105,054. In Germany April 5, 1949

17 Claims. (Cl. 260—2.5)

The present invention relates to a new process for producing cellular materials of high grade quality, for instance, sponge rubber, moss rubber, cellular rubber from natural and synthetic rubber, and foamed masses from plastics. The invention further relates to vulcanizable rubber compositions for producing sponge, moss or cellular rubber.

It is an object of the present invention to provide cellular materials of improved properties.

It is a further object of the invention to provide cellular materials of uniform cell structure and fine texture.

It is a still further object of the invention to provide a class of compounds which, when incorporated into vulcanizable rubber compositions and high molecular plastics, yield improved cellular materials.

According to another feature of the invention a class of blowing agents is provided comprising a large number of individuals with varying decomposition temperatures, whereby it is possible to adapt the decomposition temperature of the blowing agent to the working conditions used in the manufacture of cellular materials.

Two groups of blowing agents are generally used in the manufacture of cellular materials. They are inorganic blowing agents and organic substances which decompose on heating to liberate gases.

It has been found that the hydrazides of organic sulfonic acids when incorporated into high molecular plastics, act as excellent blowing agents for the manufacture of cellular materials.

The preferred class of compounds to be used as blowing agents comprises compounds of the following structures I–IV:

I.     R-SO$_2$NH-NH$_2$ wherein R represents, for instance, alkyl, aralkyl, aryl, cycloalkyl, ar-tetrahydronaphthyl radicals or alkylamino radicals or derivatives of aryl substituted by alkyl, nitro, or halogen radicals.

II.

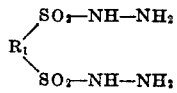

wherein R$_1$ represents, for instance, alkylene, arylene, cycloalkylene or derivatives of substituted arylene.

III.     R-SO$_2$NH-NH-R$_2$ wherein R$_2$ represents, for instance, alkyl, aryl, acyl, alkyl sulfonyl, aryl sulfonyl radicals, and R stands for the radicals as indicated under I.

IV.     R-SO$_2$NH-N=R$_3$ wherein R$_3$ represents, for instance, aldehyde or ketone radicals, R stands for the radical as indicated under I.

These sulfonic acid hydrazide derivatives display the characteristic property that they are capable of yielding the nitrogen of the hydrazide group in elementary form and quantitatively on heating without any additions being required. Decompositions may be accelerated by OH-containing solvents, such as aliphatic alcohols and water, particularly in the presence of very small quantities of alkaline compounds or oxidizing agents and the like, as well as by atmospheric oxygen.

Benzene sulfonic acid hydrazide, when heated to 100–150° C., yields phenyl disulfide and phenyl disulfoxide as decomposition products besides the quantitative amount of elementary nitrogen (cf. J. pr. Chem. 58, 163, Curtius, Lorenzen). Disulfoxide could only be detected in the termic decomposition products of the p-nitrobenzene sulfonic acid hydrazide (cf. C. 1932, I. 2835, Rec. trav. chim. Pays Bas 51, 299–319, Witte).

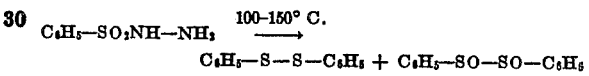

This class of blowing agents does not cause discoloration in light mixtures in the manufacture of cellular materials. The decomposition products obtained are physiologically satisfactory. The sulfonic acid hydrazides do not influence the vulcanization accelerators employed. Furthermore, mixtures prepared with the said blowing agents are perfectly stable to storage. Incorporation of these materials in synthetic or natural rubber proceeds smoothly and rapidly in accordance with the usual working methods. Cellular materials prepared with sulfonic acid hydrazides are odorless and of uniform cell structure. The size of the cells can be varied so that cellular materials may be obtained with from coarse to fine pores of uniform size and with uniform results from batch to batch.

Curing of such mixtures may be effected in gastight molds under pressure at 130° to 175° C., whereby the specific pressure within the molds amounts to 200–300 kilograms per cm.$^2$ or more, or in frames in air at 135° C. and higher temperatures, yielding cellular materials of uniform cell structure with a closed surface of about 0.1 mm. thickness, which can be easily removed by abrasion, so that the waste in the manufacture of such articles is negligible. Packing materials, such as profiled and round extrusion products which hitherto could be cured under pressure in only limited lengths, can now be blown and cured in any desired length and without the use of molds in air in a continuous working process by using sulfonic acid hydrazides as blowing agents. The rate of blowing can be exactly controlled by applying constant pressure.

The compounds are also suitable as blowing agents in the manufacture of hollow rubber articles, such as balls, syringes and the like. As compared with the hitherto known blowing agents for the said purposes, such as ammonium nitrite, the new blowing agents have the advantage that they can be applied without water and without affecting the inside of the hollow articles.

The new group of blowing agents may be applied in the process for the manufacture of cellular rubber, which process requires a pressure of 100 atmospheres that hitherto was produced in expensive apparatus by pressing in nitrogen. When using the new blowing agents the process is carried out in two steps in simple apparatus.

The mixture containing the sulfonic acid hydrazides is pre-cured in molds under pressure or in an autoclave, until a gas-tight but still moldable state is achieved. The gas-tight mold or the pressure in the autoclave prevent expanding of the mixture and escaping of the enclosed gas. On reducing the pressure after curing and cooling down to room temperature, the gas expands forming very small closed cells, whereby the original volume of the mixture is increased. In the second step the pre-cured blown mixture is further blown and cured either in molds or in the autoclave, for instance, up to atmospheric pressure or to a certain suitable pressure.

In a similar manner under appropriate working conditions and with a sulfonic acid hydrazide of the general formulae I–IV selected with regard to its decomposition temperature, it is possible to manufacture cellular materials from other plastics, such as polyvinyl chloride, polystyrene, acetyl cellulose, polyamides and the like. For instance, porous masses from polyvinyl chloride with a very low specific gravity can be produced by means of the above mentioned blowing agents by carrying out the process in steps. Thus, polyvinyl chloride, a plasticizer, and a blowing agent from the group of sulfonic acid hydrazides decomposing at 105–145° C. are mixed and heated in gas-tight molds to 145–170° C. On opening the mold after cooling down to room temperature, the cellular plastic has a strong tendency to increase its volume and can easily be removed from the mold. Volume increase is about the 3 to 5-fold-volume of the original volume of the starting mixture. On after-treating the said cellular polyvinyl chloride at a temperature of 100–125° C., a further increase of the volume and a further decrease of the specific gravity are achieved. The foamed plastics obtained in this manner have very fine closed cells and a specific gravity ranging from 0.5 to 0.3.

In a similar manner the other plastics, for instance, acetyl cellulose, polystyrene or polyamides, may be blown by means of blowing agents from the group of organic sulfonic acid hydrazides.

Blowing is effected at temperatures above 120° C. in the presence of plasticizers, whereby with increasing quantities of plasticizers products of high plasticity are obtained. The cellular materials obtained are distinguished by low unit weights and very uniform cell structure. To avoid discoloration which takes place at higher temperatures, some plastics, for instance, polyvinyl chloride, are cured with benzoic acid or sodium bicarbonate.

The sulfonic acid hydrazides obtained in the known manner (cf. J. pr. Chem. 58, 166, Curtius, Lorenzen) are mostly solid, crystalline substances which in the pure state are odorless and colorless and—depending on their constitution—soluble in hydrocarbons, such as benzine or benzene. In high molecular plastics they do not bloom after once being incorporated therein.

In the dry state at ordinary or slightly raised temperatures the compounds are stable to storage and resistant to shock and striking.

Since these hydrazine derivatives may be substituted in many ways, for instance, in the organic sulfonic acid radical and in the $NH_2$-group of the hydrazide radical, blowing agents suitable for almost any decomposition temperature ranging from 80 to 250° C., that is for the most different technical manufacturing processes of cellular materials, may be produced, as may be shown in the example for benzene sulfonic acid hydrazides.

| Compound | General Formula | Decomposition Temperature, °C. |
|---|---|---|
| Benzene sulfonic acid hydrazide | I | 104 |
| Benzene sulfonic acid N-phenyl hydrazide | III | 146 |
| N-acetonyl benzene sulfonic acid hydrazide | IV | 143 |
| Benzene 1.3-disulfonic acid hydrazide | II | 145 |
| N-acetyl benzene sulfonic acid hydrazide | III | 185 |
| Bis-benzene sulfonic acid hydrazide | III | 245 |

The sulfonic acid hydrazides are mechanically mixed with the plastic while using the customary accelerators, fillers, plasticizers or also other blowing agents. The mixture is then heated to temperatures at which decomposition of the above mentioned hydrazides takes place. The quantity of the sulfonic acid hydrazides that may be added to the mixture prior to curing may be varied from 2% by weight to 25% by weight. In most cases they are applied in proportions of 3% to 18% by weight. The preferred class of sulfonic acid hydrazides and their decomposition products formed during the process are not detrimental to the human organism. The decomposition products have no discoloring effect on light material.

A further advantage of the present invention resides in the fact that no special equipment is required for the production of cellular materials in connection with the preferred class of blowing agents. The equipment ordinarily used in the preparation of the cured materials can also be employed for the manufacture of cellular materials according to the present invention. For the manufacture of cellular materials from high molecular plastics including rubber all sulfonic acid hydrazides may be used which fall within the scope of the general formulae I to IV. The following hydrazides may be mentioned with their melting and decomposition points, showing various possibilities of application under consideration of their decomposition temperatures. The invention is in no way to be limited to the selection of the preferred compounds.

| | Melting Point, C. | Decomposition temperature, C. |
|---|---|---|
| Benzene sulfonic acid hydrazide | 103.5-104 | about 104. |
| Benzaldehyde derivative | 110-112 | about 111. |
| Acetone drivative | 143-145 | about 144. |
| Monoacetyl compound | 183-184 | about 184. |
| Cyclohexanone derivative | 146-146.5 | about 146. |
| p-Chlorobenzene sulfonic acid hydrazide | 114-118 | about 116. |
| Benzaldehyde derivative | 128-129 | about 129. |
| Acetone derivative | 140-143 | about 142. |
| 4-nitrobenzene sulfonic acid hydrazide | 142 | about 142. |
| 3-nitrobenzene sulfonic acid hydrazide | 126-127 | about 127. |
| 3.4-dichlorobenzene sulfonic acid hydrazide | 122-123 | about 123. |
| p-Toluene sulfonic acid hydrazide | 105-106.5 | about 106. |
| Dimethyl-benzene sulfonic acid hydrazide | 100-103.5 | about 102. |
| 1.3-dimethyl-benzene sulfonic acid hydrazide | 112-113 | about 113. |
| 1.4-dimethyl-benzene sulfonic acid hydrazide | 68-70 | about 80-85. |
| ω-Toluene sulfonic acid hydrazide | 122-124 | about 123. |
| α-Naphthalene sulfonic acid hydrazide | 123 | about 123. |
| Acetone derivative | 165 | about 165. |
| Benzaldehyde derivative | 153 | about 153. |
| β-Naphthalene sulfonic acid hydrazide | 137-139 | about 138. |
| Benzaldehyde derivative | 150-152 | about 151. |
| Acetone derivative | 156-158 | about 157. |
| Monoacetyl compound | 208-209 | about 208. |
| Cyclohexane sulfonic acid hydrazide | 74.5-76 | about 75. |
| ar-Tetrahydronaphthalene sulfonic acid hydrazide (mixture of α and β isomers) | (¹) | about 90-95. |
| Diethylamino sulfonic acid hydrazide | 39-40 | about 80. |
| Benzene 1.3-disulfonic acid dihydrazide | 145 | about 145. |
| Dibenzaldehyde derivative | 171 | about 171. |
| Diacetonyl derivative (crystall. with ½ mol of acetone) | 149 | about 149. |
| m-xylene disulfonic acid dihydrazide | 204-205 | about 205. |
| Methane sulfonic acid hydrazide | (¹) | about 70. |
| Propane sulfonic acid hydrazide | (¹) | about 72. |
| Cyclohexane disulfonic acid dihydrazide | 161 | about 161. |
| Butane 1.4-disulfonic acid dihydrazide | 139-140 | about 140. |

¹ Liquid.

All compounds enumerated above are equally suitable for the manufacture of cellular materials, provided their decomposition temperatures are within the required curing temperatures, that means, the organic sulfonic acid hydrazide used must completely decompose at least at the highest curing temperature.

The invention is further illustrated by the following examples without being restricted thereto, the parts being by weight. While the preferred class of compounds are advantageously employed in certain proportions, other proportions than those specifically mentioned may obviously be employed.

Example 1

To a mixture of 65% by volume of rubber, consisting of 100.0 parts of smoked sheets, 10 parts of zinc oxide, 18 parts of mineral oil, 80 parts of whiting, 1.5 parts of dibenzothiazyldisulfide, 3.5 parts of sulfur and 3.0 parts of stearic acid, there are added from 0.5 to 4.0 parts of benzene sulfonic acid hydrazide.

Curing is effected with steam of 4 atmospheres over-pressure, that is 151° C. for 35 minutes in a closed mold in a press.

| Blowing agent, parts | Increase of volume, percent | Cell structure |
|---|---|---|
| 0.5 | 175 | small cells. |
| 1.0 | 320 | rather small cells. |
| 2.0 | 550 | medium cells. |
| 4.0 | 950 | large cells. |

Example 2

To a mixture of 80% by volume of rubber consisting of 100.0 parts of smoked sheets, 5.0 parts of mineral oil, 5.0 parts of vaseline, 10.0 parts of zinc oxide, 40.0 parts of barite, 1.5 parts of dibenzothiazyl disulfide, 3.5 parts of sulfur, 2.0 parts of stearic acid and 1.0 part of capillary active sulfonates of fatty acids, there are added from 0.33 to 4.0 parts of benzene sulfonic acid hydrazide.

Curing is effected with steam of 4 atmospheres over-pressure, that is 151° C. for 35 minutes in a closed mold in a press.

| Blowing agent, parts | Increase of volume, percent | Cell structure |
|---|---|---|
| 0.33 | 200 | finely porous cells. |
| 1.0 | 360 | Do. |
| 2.0 | 600 | Do. |
| 4.0 | 1,200 | Do. |

Example 3

100.0 parts of butadiene-acrylonitrile copolymerizate are plasticized with 2.0 parts of trichloro thiophenol by milling 40 minutes at 90° C., while adding 8.0 parts of zinc oxide, 2.0 parts of sulfur, 1.5 parts of dibenzothiazyl disulfide, 3.0 parts of phthalic acid di-n-butyl-ester, 10.0 parts of factice, 10.0 parts of lamp black, 4.0 parts of stearic acid, .02 part of hexahydroethyl aniline and 4 parts of benzene sulfonic acid hydrazide.

Mooney viscosity of the mixture=55 or Williams plasticity=0.25 [cm].

Curing in a press for 25 minutes at 100° C. and for 30 minutes at 150° C.

Increase of volume: 350%.

Example 4

100.0 parts of butadiene-styrene copolymerizate-Mooney viscosity=27 or Williams plasticity=0.13 [cm.] are blended with 10.0 parts of active zinc oxide, 2.5 parts of sulfur, 1.5 parts of dibenzothiazyl disulfide, 0.3 part of hexahydro ethyl aniline, 15.0 parts of plasticizer, 40.0 parts of siliceous chalk, 4.0 parts of stearic acid and 4.0 parts of benzene sulfonic acid hydrazide.

Mooney viscosity of the mixture=55 or Williams plasticity=0.25 [cm].

Curing in a press for 20 minutes at 110° C. and for 40 minutes at 150° C.

Increase of volume: 450%.

Example 5

Into a mixture of 50 parts of polyvinyl chloride and 50 parts of tricresyl phosphate 12% by weight (calculated on the plasticized polyvinyl chloride) of benzene sulfonic acid hydrazide decomposing at 103–104° C. are introduced in a suitable mixing device, for instance, a one or triple roller mill. To prevent discoloration 4% by weight of benzoic acid (calculated on the plasticized polyvinyl chloride) are added to the mixture. By heating the mixture in a tightly closed mold and cooling under pressure until room temperature is attained, a light-weight cellular material of very finely porous structure and specific gravity of between 0.15 and 0.2 is obtained. By placing the cellular material into boiling water the specific gravity may be further lowered.

Example 6

Into a paste of 50 parts of polyvinyl chloride and 50 parts of tricresyl phosphate 12–15% by weight of the reaction product of benzene sulfonic acid hydrazide and acetone decomposing at 142–144° C. are introduced as indicated in Example 5. In a tightly closed mold the mixture is heated to 160–170° C. under high pressure and cooled to room temperature while maintaining the pressure. In this manner a foamed plastic is obtained the specific gravity of which is between 0.15 and 0.3, depending on the working temperature and the proportion of the blowing agent added. By subsequent free heating to 100–120° C. the specific gravity may be further lowered.

*Example 7*

To a paste of 50 parts of polyvinyl chloride and 50 parts of tricresyl phosphate 5–10% by weight of n-butane-1.4-disulfonic acid hydrazide decomposing at 139–140° C. are added as indicated in Example 5. To prevent discoloration during molding of the polyvinyl chloride mixture 1–2% by weight of sodium bicarbonate are added. The mixture is heated to 160–165° C. in a tightly closed mold and cooled under pressure. In this manner a colorless very fine foamed plastic with a specific gravity of about 0.3 is obtained. On heating again to 100–120° C. the specific gravity can be considerably lowered.

*Example 8*

To a mixture of 50 parts of polyvinyl chloride and 50 parts of tricresyl phosphate 10% by weight of m-xylene sulfonic acid hydrazide and 1–2% by weight of sodium bicarbonate are added as indicated in Example 5. After heating the mixture to 165° C. in a tightly closed mold and after cooling down the mold to room temperature under pressure, a light-weight cellular plastic having closed cells and a specific gravity of about 0.12–0.14 is obtained. By heating again to 100–120° C. the specific gravity may be further lowered.

*Example 9*

To a paste of 50 parts of polyvinyl chloride and 50 parts of tricresyl phosphate 18% by weight of benzene sulfohydrazide decomposing at 103–104° C. are added as indicated in Example 5. To prevent discoloration of the polyvinyl chloride mixture during molding 10% of benzoic acid are added. After heating the mixture to 145° C. in a tightly closed mold and cooling down the mold under pressure to room temperature, a finely porous, light-weight material is obtained. Its specific gravity is 0.07. To complete the expansion the porous material is heated to 100–120° C. Thus the specific gravity is lowered to 0.06–0.05.

*Example 10*

100 parts of polystyrene which have been finely ground are mixed in a ball mill with 7.5 parts of benzene sulfohydrazide at room temperature. The mixture is then introduced into a tightly closed mold and heated to a temperature of 140° C. It is then cooled under pressure to about 40° C. and removed from the mold. By exposing the molded material to air of 100–120° C. a light-weight material of very fine cell structure is obtained having a specific gravity of 0.2 and a compressive strength of 24 kilograms cm$^2$.

*Example 11*

70 parts of acetyl cellulose containing 52–53% of acetyl calculated as acetic acid are treated in a kneading-machine with 30 parts of acetone at rising temperature up to 120° C. The kneaded material is then mixed in a roll mill at 50–60° C. with 12% of benzene sulfohydrazide calculated on the quantity of acetyl cellulose used. The rolled sheet obtained—after having been reduced to small pieces—is heated to 140° C. in a tightly closed mold and cooled under pressure to room temperature. The molded article exhibits a typical cellular structure and by warming up to 100–120° C. for a short time a light-weight material of low specific gravity is formed.

For further specific examples 15 organic sulfonic acid hydrazides (see following table) were tested in a typical rubber stock comprising (in parts by weight):

| | |
|---|---|
| Crepe | 100.0 |
| Zinc oxide | 10.0 |
| Sulfur | 3.5 |
| Mercapto benzothiazyl disulfide | 1.5 |
| Mineral oil | 18.0 |
| Whiting | 80.0 |
| Stearic acid | 3.0 |

To this base stock were added organic sulfonic acid hydrazides (column 1) in per cent by weight referring to the rubber content in the compound (column 2).

The volume increase, after curing in a mold for 35 minutes with steam of 4 atmospheres overpressure, that is at 151° C., is shown in column 3. The products were of uniform quality and showed uniform pores.

| Blowing Agent | Quantity of blowing agent, percent by weight | Increase of volume, percent |
|---|---|---|
| p-Toluene sulfonic acid hydrazide | 3.75 | 700 |
| Xylene sulfonic acid hydrazide | 4.00 | 600 |
| m-Xylene sulfonic acid hydrazide | 3.75 | 600 |
| p-Xylene sulfonic acid hydrazide | 3.75 | 600 |
| β-Naphthalene sulfonic acid hydrazide | 4.25 | 600 |
| ω-Toluene sulfonic acid hydrazide | 3.75 | 675 |
| p-Chlorobenzene sulfonic acid hydrazide | 4.00 | 600 |
| 3.4-Dichlorobenzene sulfonic acid hydrazide | 4.50 | 600 |
| Methane sulfonic acid hydrazide | 3.00 | 500 |
| Propane sulfonic acid hydrazide | 3.00 | 1000 |
| Cyclohexane sulfonic acid hydrazide | 3.75 | 675 |
| Isoparaffin sulfonic acid hydrazide | 4.25 | 675 |
| ar-Tetrahydronaphthalene sulfonic acid hydrazide | 4.25 | 700 |
| Diethylamino sulfonic acid hydrazide | 3.37 | 400 |
| Acetonyl-benzene sulfonic acid hydrazide | 3.00 | 500 |

We claim:

1. The process which comprises incorporating a hydrazide of an organic sulfonic acid in a high molecular organic plastic and heating this mixture to a temperature above the decomposition point of said hydrazide.

2. The process which comprises incorporating a hydrazide of an organic sulfonic acid, said hydrazide decomposing at a temperature of from about 80° to about 250° C., in a high molecular organic plastic and heating this mixture to a temperature above the decomposition point of said hydrazide.

3. The process which comprises incorporating a hydrazide of an organic sulfonic acid, said hydrazide decomposing at a temperature of from about 80° to about 250° C., at least one hydrogen atom of the NH$_2$-group of said hydrazide being substituted by one organic radical, in a high molecular organic plastic and heating this mixture to a temperature above the decomposition point of said hydrazide.

4. The process which comprises incorporating a dihydrazide of an organic disulfonic acid, said dihydrazide decomposing at a temperature of from about 80° to about 250° C., in a high molecular organic plastic and heating this mixture to a temperature above the decomposition point of said dihydrazide.

5. The process which comprises incorporating a hydrazide of an organic sulfonic acid, said hydrazide decomposing at a temperature of from about 80° to about 250° C., at least one hydrogen atom of the NH₂-group of said hydrazide being substituted by one organic sulfonic acid, in a high molecular organic plastic and heating this mixture to a temperature above the decomposition point of said hydrazide.

6. The process which comprises incorporating a hydrazide of benzene sulfonic acid, said hydrazide decomposing at a temperature of from about 80° to about 250° C., in a high molecular organic plastic and heating this mixture to a temperature above the decomposition point of said hydrazide.

7. The process which comprises incorporating a hydrazide of cyclohexane sulfonic acid, said hydrazide decomposing at a temperature of from about 80° to about 250° C., in a high molecular organic plastic and heating this mixture to a temperature above the decomposition point of said hydrazide.

8. The process which comprises incorporating a dihydrazide of a disulfonic acid of an aliphatic hydrocarbon, said dihydrazide decomposing at a temperature of from about 80° to about 250° C., in a high molecular organic plastic and heating this mixture to a temperature above the decomposition point of said dihydrazide.

9. A vulcanizable rubber composition having incorporated therein sulfur, an accelerator of vulcanization and a hydrazide of an organic sulfonic acid decomposing at a temperature of from about 100° to about 180° C.

10. A vulcanizable rubber composition having incorporated therein sulfur, an accelerator of vulcanization and a hydrazide of an organic sulfonic acid, said hydrazide decomposing at a temperature of from about 100° to about 150° C., at least, one hydrogen atom of the NH₂-group of said hydrazide being substituted by one organic radical.

11. A vlcanizable rubber composition having incorporated therein sulfur, an accelerator of vulcanization and a dihydrazide of an organic disulfonic acid decomposing at a temperature of from about 100° to about 150° C.

12. A vulcanizable rubber composition having incorporated therein sulfur, an accelerator of vulcanization and a hydrazide of organic sulfonic acid, one hydrogen atom of the NH₂-group of said hydrazide being substituted by an organic sulfonic acid.

13. A vulcanizable rubber composition having incorporated therein sulfur, an accelerator of vulcanization and a hydrazide of benzene sulfonic acid decomposing at a temperature of from about 100° to about 150° C.

14. A vulcanizable rubber composition having incorporated therein sulfur, an accelerator of vulcanization and a hydrazide of cyclohexane sulfonic acid, said hydrazide decomposing at a temperature of from about 100° to about 150° C.

15. A vulcanizable rubber composition having incorporated therein sulfur, an accelerator of vulcanization and a dihydrazide of a disulfonic acid of an aliphatic hydrocarbon, said dihydrazide decomposing at a temperature of from about 100° to about 150° C.

16. The process which comprises incorporating a hydrazide of an aromatic sulfonic acid in a high molecular weight organic plastic and heating this mixture to a temperature above the decomposition point of said hydrazide.

17. The process which comprises incorporating a hydrazide of an aliphatic sulfonic acid in a high molecular weight organic plastic and heating this mixture to a temperature above the decomposition point of said hydrazide.

FRIEDRICH LOBER.
MAX BÖGEMANN.
RICHARD WEGLER.

REFERENCES CITED

The following references are of record in the file of this patent:

Sachs: Modern Plastics, December 1945 pp. 173–176.

Curtius et al.: Journal fur Prak Chemie, 58 pp. 160–164.

Witte: Rec. Trar. Chim. Pays Bas, 51 pp. 299–319.